United States Patent [19]

Lemieux

[11] Patent Number: 5,594,739
[45] Date of Patent: Jan. 14, 1997

[54] SYSTEM AND METHOD FOR RAPID SELECTION OF SYNCHRONIZATION SOURCES IN A MOBILE TELECOMMUNICATIONS NETWORK

[75] Inventor: Yves Lemieux, Kirkland, Canada

[73] Assignee: Telefonaktiebolaget LM Ericsson, Stockholm, Sweden

[21] Appl. No.: 548,336

[22] Filed: Nov. 1, 1995

[51] Int. Cl.⁶ .................. H04J 3/06; H04L 7/04
[52] U.S. Cl. ............ 570/350; 370/522; 455/51.1
[58] Field of Search .............. 370/79, 68.1, 103, 370/100.1, 150.1, 105.2, 105.4, 105.5, 95.1, 95.3; 379/59, 60, 63, 114, 115; 375/356; 455/51.1, 54.1, 54.2, 33.1; 395/550, 200.19

[56] References Cited

U.S. PATENT DOCUMENTS 5,245,634  9/1993  Averbuch .................. 375/356
5,363,377  11/1994  Sharpe ..................... 370/100.1
5,386,418  1/1995  Komuro et al. ............. 370/103

OTHER PUBLICATIONS

TR45.3.6/94.11.14.03 Digital Cellular Systems, "Recommended Text for IS–136.1", Nov. 14, 1994, pp. 4–11.
Bellcore Technical Advisory, TA–NWT–000436, Issue 2, Jun. 1993, pp. 3–3 through 3–6.

Primary Examiner—Douglas W. Olms
Assistant Examiner—Chau T. Nguyen
Attorney, Agent, or Firm—Smith & Catlett, P.C.

[57] ABSTRACT

A network management system and method in a telecommunications network for selectively accessing a plurality of synchronization sources of varying levels of accuracy, availability, and cost, and for enabling individual subscribers to select which synchronization source they utilize for each service application. Alternatively, the network management system may dynamically provide each subscriber with the least expensive synchronization source having the required level of accuracy for the subscriber's selected application.

24 Claims, 4 Drawing Sheets

SYSTEM AND METHOD FOR RAPID SELECTION OF SYNCHRONIZATION SOURCES IN A MOBILE TELECOMMUNICATIONS NETWORK

BACKGROUND OF THE INVENTION

1. Technical Field of the Invention

This invention relates to mobile telecommunication systems and, more particularly, to a system and method of supervising proper frame and time slot synchronization between radio base stations and mobile stations in a mobile telecommunications network.

2. Description of Related Art

Personal Communication Services (PCS) is a synchronous data communication service to be offered as an end-user communication service for mobile subscribers. IS-136.2, one of the standards for PCS operations, requires a common source for synchronization of symbol and Time Division Multiple Access (TDMA) frame and time slots with an absolute frequency tolerance of approximately +/−5 parts per million (ppm) (translated to Stratum 3E). IS-136.2 is hereby incorporated by reference herein. Future services are expected to include more digitized data as services include more data transfer and video with real-time capabilities in addition to voice. Tolerances tighter than the +/−5 ppm of IS-136.2 may be required for some applications. A strong need therefore exists to define Operation and Maintenance (O&M) objects that are capable of properly supervising synchronization between base stations and mobile stations.

The current synchronization source for mobile telecommunications networks is classified as Stratum 4 at the user end, and its accuracy has been adequate for voice and most data communications. However, communications such as high definition video require a more accurate synchronization source. There are several alternative sources for network synchronization which provide better accuracy than Stratum 4 at the user end. These sources, in order of decreasing accuracy, include the Global Positioning System (GPS), the Loran-C navigation system, and SONET Digital Hierarchy (SDH) O&M. Each of these synchronization sources provides a different level of accuracy, and the more accurate sources are generally more expensive to implement, access, and utilize as synchronization sources for mobile telecommunications networks. To date, service providers have not offered the more expensive synchronization sources at the user end because there is no billing structure set up to charge their subscribers for the increased cost of operation, and the service providers do not want to pay for the increased capability themselves.

One solution to the problem of providing adequate synchronization for all service applications is to implement the most accurate synchronization source and utilize it for all applications. However, this solution is very expensive, and generally provides a more accurate source than most service applications require. With this solution, subscribers utilizing applications with less stringent requirements would pay unnecessarily high rates because of the higher synchronization cost. Subscribers utilizing service applications requiring the tightest synchronization tolerance, on the other hand, would be subsidized by the subscribers having less stringent requirements since payments from the other subscribers help pay for the synchronization source.

It would be advantageous to have a system in a mobile telecommunications network that provides required levels of synchronization while overcoming the inequities of existing solutions regarding cost to subscribers. The present invention provides such a system.

SUMMARY OF THE INVENTION

In one aspect, the present invention is a network management system in a telecommunications network for selectively accessing a plurality of synchronization sources of varying levels of accuracy, availability, and cost, and for enabling individual subscribers to select which synchronization source they utilize for each service application. Alternatively, the network management system may dynamically provide each subscriber with the least expensive synchronization source having the required level of accuracy for the subscriber's selected application.

In particular, the network management system selectively accesses a plurality of synchronization sources of varying levels of accuracy, availability, and cost, and enables an individual subscriber to select one of the plurality of synchronization sources for each telecommunication service application utilized by the subscriber. The network management system comprises means for informing the subscriber which of the plurality of synchronization sources are available for each of the subscriber's service applications, and means for enabling the subscriber to select one of the plurality of synchronization sources for use with a service application. The system also includes a centralized transport synchronization module (CTSM) that interrogates the plurality of synchronization sources and selectively connects the sources to the telecommunications network, as well as means for informing the CTSM which of the plurality of synchronization sources is selected by the subscriber.

In another aspect, the present invention is a method of selectively accessing a plurality of synchronization sources of varying levels of accuracy and cost, and enabling individual subscribers to select which synchronization source they utilize for each service application.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

Figure 1:
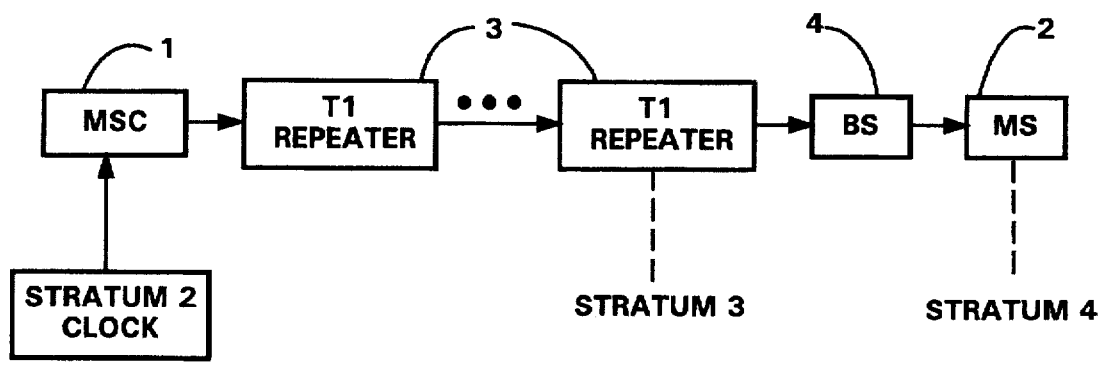
FIG. 1 is a block diagram of a portion of a mobile radio telecommunications network illustrating the link between a mobile switching center (MSC) and a mobile station (MS)

The present invention is a network management system in a telecommunications network for selectively accessing a plurality of synchronization sources of varying levels of accuracy, availability, and cost, and for enabling individual subscribers to select which synchronization source they utilize for each service application. Alternatively, the network management system may dynamically provide each subscriber with the least expensive synchronization source having the required level of accuracy for the subscriber's selected application. The rate that the network operator charges for each application may vary in relation to the cost of the synchronization source required. Those subscribers who do not utilize the more accurate and costly synchronization sources do not pay for them while the subscribers who do utilize the more accurate and costly synchronization sources pay for the extra capability they receive. Each individual subscriber, therefore, may determine whether utilization of a selected synchronization source is cost effective for a particular application.

As an example, an emergency vehicle such as an ambulance may be equipped with mobile telephone, fax, data, and video equipment. If the emergency personnel choose to make an ordinary telephone call, they may choose, or the network management system may automatically provide, a Rubidium-based synchronization source which is commonly used in existing radio telephone networks and which provides at the user end, a Stratum 4 synchronization source. However, if the emergency personnel later switch to high definition video equipment in order to send real-time video images back to a doctor in a hospital, then a more accurate synchronization source such as GPS may be selected.

Stratum level specifications for Stratums 1 through 4 are defined in the Bellcore Technical Advisory TA-NWT-000436, Issue 2, June 1993, which is hereby incorporated by reference herein. The free-run accuracy, holdover stability, and pull-in/hold-in range of each defined Stratum is illustrated in Table 1 below.

TABLE 1

| Stratum Level | Free-Run Accuracy | Holdover Stability | Pull-in/ Hold-in Range |
|---|---|---|---|
| 1 | $\pm 1 \times 10^{11}$ | N/A | N/A |
| 2 | $\pm 1.6 \times 10^{-8}$ | $\pm 1 \times 10^{-10}$ per day | $1.6 \times 10^{-8}$ |
| 3E | $\pm 4.6 \times 10^{-6}$ | $1 \times 10^{-8}$ day 1 | $4.6 \times 10^{-6}$ |
| 3 | $\pm 4.6 \times 10^{-6}$ | <255 slips during first day of holdover | $4.6 \times 10^{-6}$ |
| 4 | $\pm 32 \times 10^{-6}$ | No Holdover | $32 \times 10^{-6}$ |

A Stratum 1 clock is required to have a long-term accuracy of better than $1 \times 10^{-11}$ completely autonomous of other references. Currently, cesium beam references are the only technology deployed in the network that are true Stratum 1 clocks. Other timing references maintain Stratum 1 accuracy through direct control from Universal Coordinated Time (UCT) derived frequency and time services. Two examples of technologies that are not autonomous Stratum 1 clocks are the Global Positioning System (GPS) and LORAN-C navigational systems.

Stratum 2 clocks are typically based on either double oven crystal oscillators or rubidium atomic oscillators. To take advantage of the stable oscillators and provide the best holdover estimate possible, Stratum 2 clocks usually have long time constants for averaging their input frequency reference.

Stratum 3 clocks are typically based on Temperature Compensated Crystal Oscillators (TCXO). Stratum 3E clocks are required to have the same free-run accuracy as Stratum 3, and are required to filter a reference timing input with large short-term instability to create a clean timing output with low levels of short-term instability. To achieve this filtering, a stable oscillator is necessary. The stable oscillator, which may be an Oven Controlled Crystal Oscillator (OCXO), provides a significant improvement in holdover performance over Stratum 3. Stratum 3E clocks also provide full Stratum 3 pull-in/hold-in range so that they are compatible with existing Stratum 3 clocks.

Stratum 4 clocks do not provide holdover and enter free-run when they lose their reference input. Stratum 4 clocks are not utilized in interoffice synchronization distribution networks, but may be utilized for digital channel banks.

FIG. 1 is a block diagram of a portion of a mobile radio telecommunications network illustrating the link between a mobile switching center (MSC) 1 and a mobile station (MS) 2. A number of T1 repeaters 3 are sequentially located on a link between the MSC 1 and a base station (BS) 4. In this configuration, referred to as "line topology", a signal sent from the MSC to the mobile station is subject to the cumulative effects of jitter and other phenomena which decrease the accuracy of the timing reference. For example, if a Stratum 2 synchronization source 5 such as Rubidium is utilized at the MSC 1, the timing reference may degrade to Stratum 3 as it passes through the T1 repeaters 3, and may degrade to Stratum 4 when it reaches the end user mobile station 2. As noted above, however, IS-136.2 requires a common source for synchronization of symbol and Time Division Multiple Access (TDMA) frame and time slots of Stratum 3E at the end user. Therefore, typical line topology configurations, with Stratum 2 clocks such as Rubidium implemented at the MSC, do not meet the requirements of IS-136.2.

One solution to the degradation experienced in line topology configurations is to implement a synchronization source for each component. Thus, the base station 4 would have its own Stratum 2 synchronization source. This solution, however, is not practical because of the expense involved. Another solution is to utilize a configuration known as "star topology" in which all components of the network access a single synchronization source such as GPS or LORAN-C. However, the availability of these navigational system synchronization sources may not be adequate for telecommunications networks.

Figure 2:
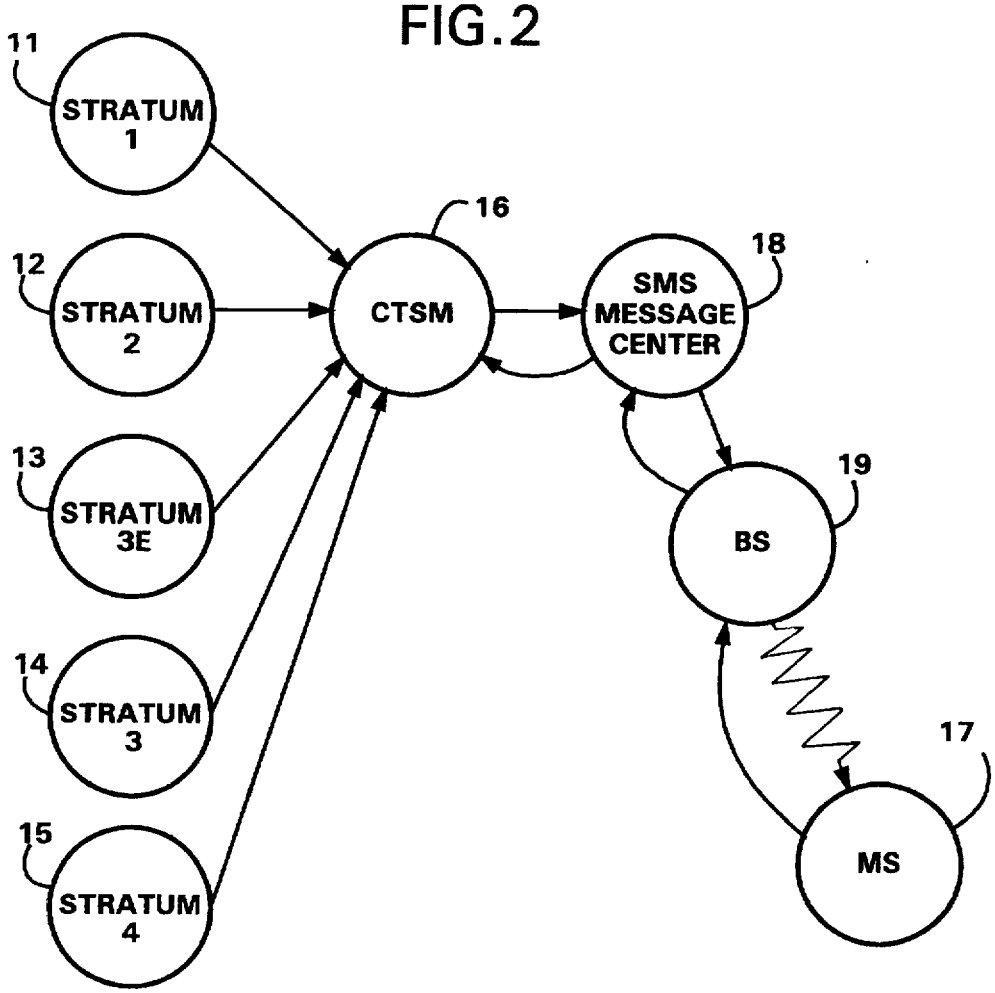
FIG. 2 is a block diagram of an exemplary embodiment of a Personal Communication System (PCS) Synchronization Model having multiple, selectable synchronization sources in accordance with the teachings of the present invention.

FIG. 2 is a block diagram of an exemplary embodiment of a Personal Communication System (PCS) Synchronization Model 10 which may be part of a larger performance management logical entity in a telecommunications network's O&M system. The Synchronization Model 10 includes a plurality of synchronization sources 11–15 that may range, for example, from Stratum 1 clocks to Stratum 4 clocks. A centralized transport synchronization module (CTSM) 16 reads synchronization information from each of the synchronization sources 11–15. In the preferred embodiment, the CTSM 16 communicates with a mobile station 17 utilizing short message service (SMS) messages. The messages may be transmitted via a SMS message center 18 and a base station 19. The sending and receiving of SMS messages is well known in the art, and is discussed in detail in IS-136.1 which is hereby incorporated by reference herein.

The accuracy of each of the synchronization sources 11–15 is known by the CTSM 16 which performs a mapping function to match the proper synchronization source to a requested service application. The proper synchronization source may be, for example, the lowest cost source that guarantees the transmission quality of the selected service.

If more than one synchronization source will provide the required accuracy for the requested service, the CTSM 16 may provide the subscriber with a choice of sources. The subscriber may choose a higher quality source in order to ensure good transmission quality of, for example, high priority data or video transmissions. Preferably, the subscriber is provided with a list of synchronization sources that meet the minimum requirements for the selected service application. Optionally, the CTSM 16 may also map the synchronization sources to associated billing rates and provide the billing rate for each source to the subscriber. The subscriber then chooses a synchronization source based upon service application type, desired transmission quality, and the associated billing rate. The subscriber then sends an acknowledgement message contained on a call associated feature to the CTSM 16. The associated billing rate is then utilized for the service.

The subscriber may also select a synchronization source and respond to the CTSM 16 with a return SMS message. However, since SMS messaging does not directly enable a subscriber to transmit a selection from a list, the synchronization options may be presented one at a time, and the subscriber sends a return acknowledgement message to the CTSM 16 when the synchronization source of choice is displayed on the mobile station display screen. If the subscriber does not choose one of the displayed synchronization options, the CTSM 16 may revert to a default synchronization source and notify the subscriber that the system cannot guarantee the transmission quality of the selected service.

Figure 3:
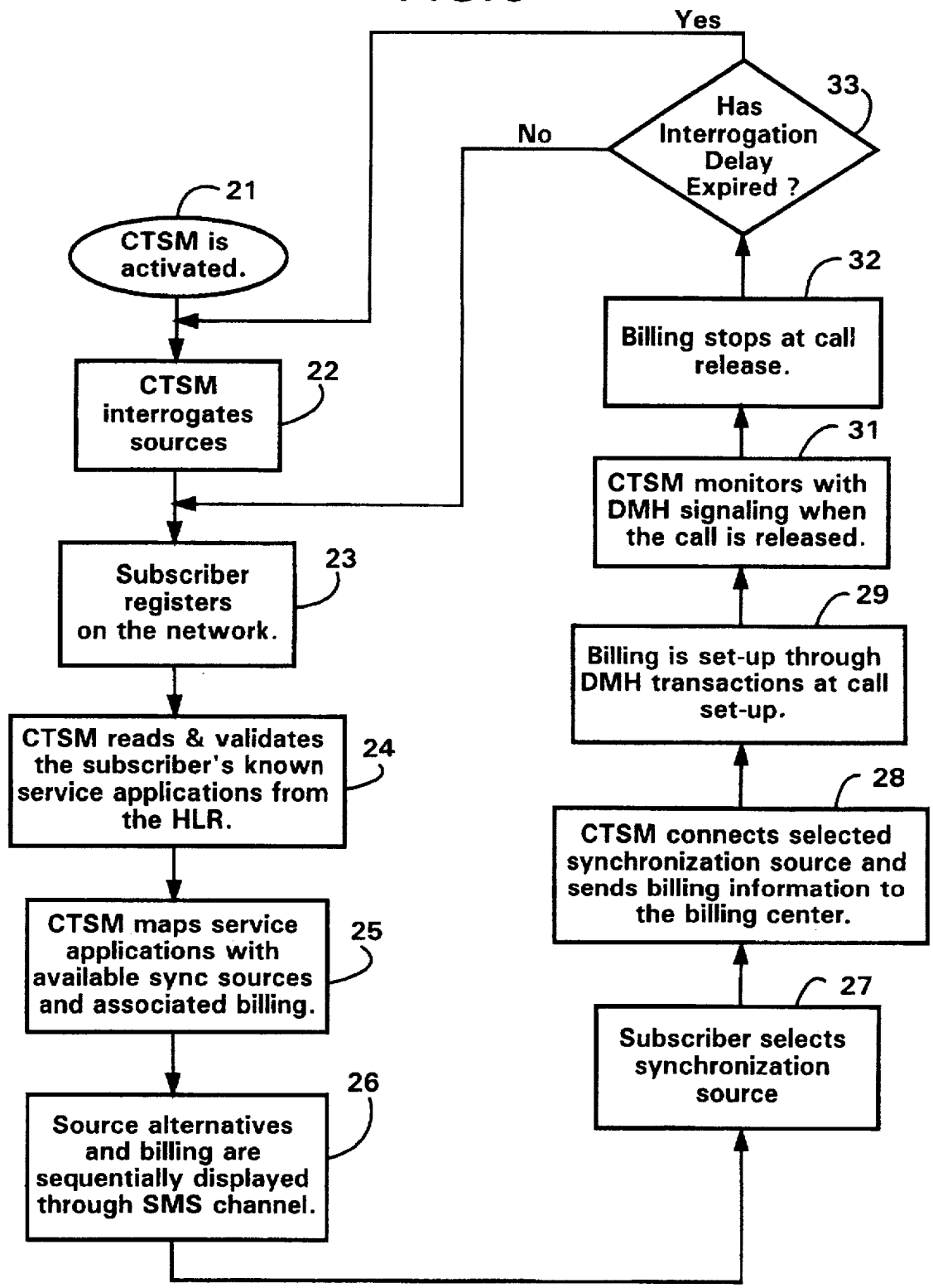
FIG. 3 is a flow chart illustrating the functions performed by the PCS Synchronization Model in a first embodiment of the present invention.

FIG. 3 is a flow chart illustrating the functions performed by the PCS Synchronization Model in a first embodiment of the present invention. The sequence begins at step 2 1 when the CTSM 16 is activated. At 22, the CTSM interrogates the synchronization sources 11–15 to determine their Stratum levels and availability. This interrogation is repeated periodically at the expiration of an interrogation delay since the availability of synchronization sources may change. At step 23, a subscriber registers on the telecommunications network. The system then moves to step 24 where the CTSM reads and validates the subscriber's known services or applications from the subscriber's home location register (HLR). At 25, the CTSM maps the subscriber's service applications with available synchronization sources and with associated billing rates for each source.

At 26, the CTSM 16 sends an SMS message to the mobile station 17. The SMS message sequentially displays synchronization source alternatives to the subscriber. At 27, the subscriber selects a displayed alternative through a call associated feature such as *#. An acknowledgement message is sent from the mobile station 17 via the base station 19 and SMS message center 18 to the CTSM 16. The CTSM then connects the selected synchronization source at step 28, and sends billing information to a billing center. The billing center sets up billing at step 29 through Data Message Handler (DMH) transactions at call setup.

At step 31, the CTSM 16 determines when the call is released. This may be accomplished by monitoring DMH signaling. Billing stops at step 32 when it is determined that the call has been released. At step 33 it is determined whether or not the interrogation delay has expired. If it has not expired, then the system moves to step 23 and waits for the next subscriber to register on the network. If the delay has expired, then the system moves to step 22 where the synchronization sources are again interrogated for Stratum level and availability.

Figure 4:
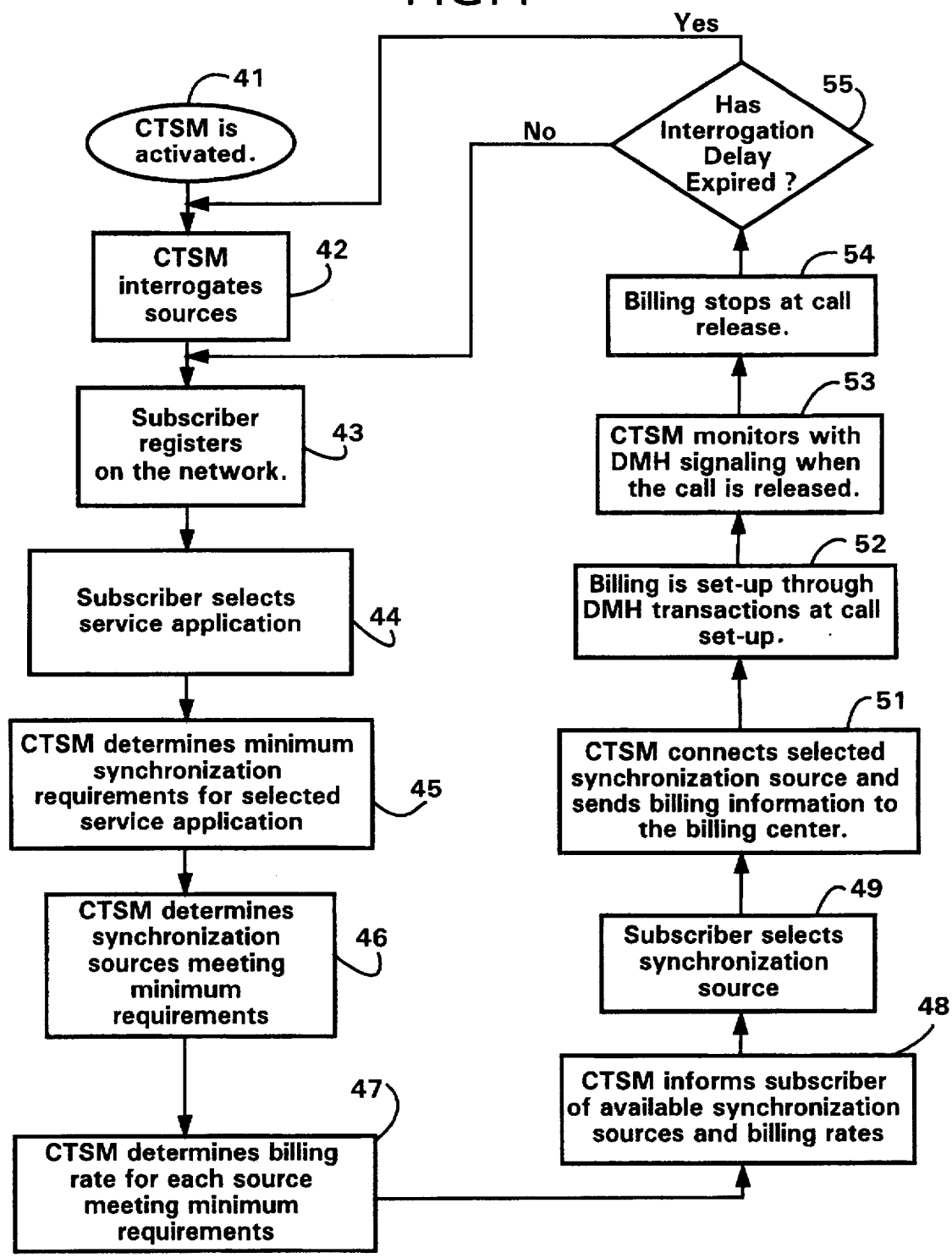
FIG. 4 is a flow chart illustrating the functions performed by the PCS Synchronization Model in a second embodiment of the present invention.

FIG. 4 is a flow chart illustrating the functions performed by the PCS Synchronization Model in a second embodiment of the present invention. The sequence begins at step 41 when the CTSM 16 is activated. At 42, the CTSM interrogates the synchronization sources 11–15 to determine their Stratum levels and availability. This interrogation is repeated periodically at the expiration of an interrogation delay since the availability of synchronization sources may change. At step 43, a subscriber registers on the telecommunications network. The system then moves to step 44 where the subscriber selects a service application such as, for example, data transfer. At step 45, the CTSM 16 determines the minimum synchronization requirements for the selected service application. The CTSM then determines at step 46 which of the available synchronization sources meet the minimum synchronization requirements. At step 47, the CTSM determines an associated billing rate for each of the available synchronization sources meeting the minimum synchronization requirements.

At step 48, informs the subscriber of the available synchronization sources meeting the minimum synchronization requirements, and their associated billing rates through an SMS message to the mobile station 17. At 49, the subscriber selects a displayed alternative through a call associated feature such as *#. An acknowledgement message is sent from the mobile station 17 via the base station 19 and SMS message center 18 to the CTSM 16. The CTSM then connects the selected synchronization source at step 51, and sends billing information to a billing center. The billing center sets up billing at step 52 through Data Message Handler (DMH) transactions at call setup.

At step 53, the CTSM 16 determines when the call is released. This may be accomplished by monitoring DMH signaling. Billing stops at step 54 when it is determined that the call has been released. At step 55 it is determined whether or not the interrogation delay has expired. If it has not expired, then the system moves to step 43 and waits for the next subscriber to register on the network. If the delay has expired, then the system moves to step 42 where the synchronization sources are again interrogated for Stratum level and availability.

Figure 5:
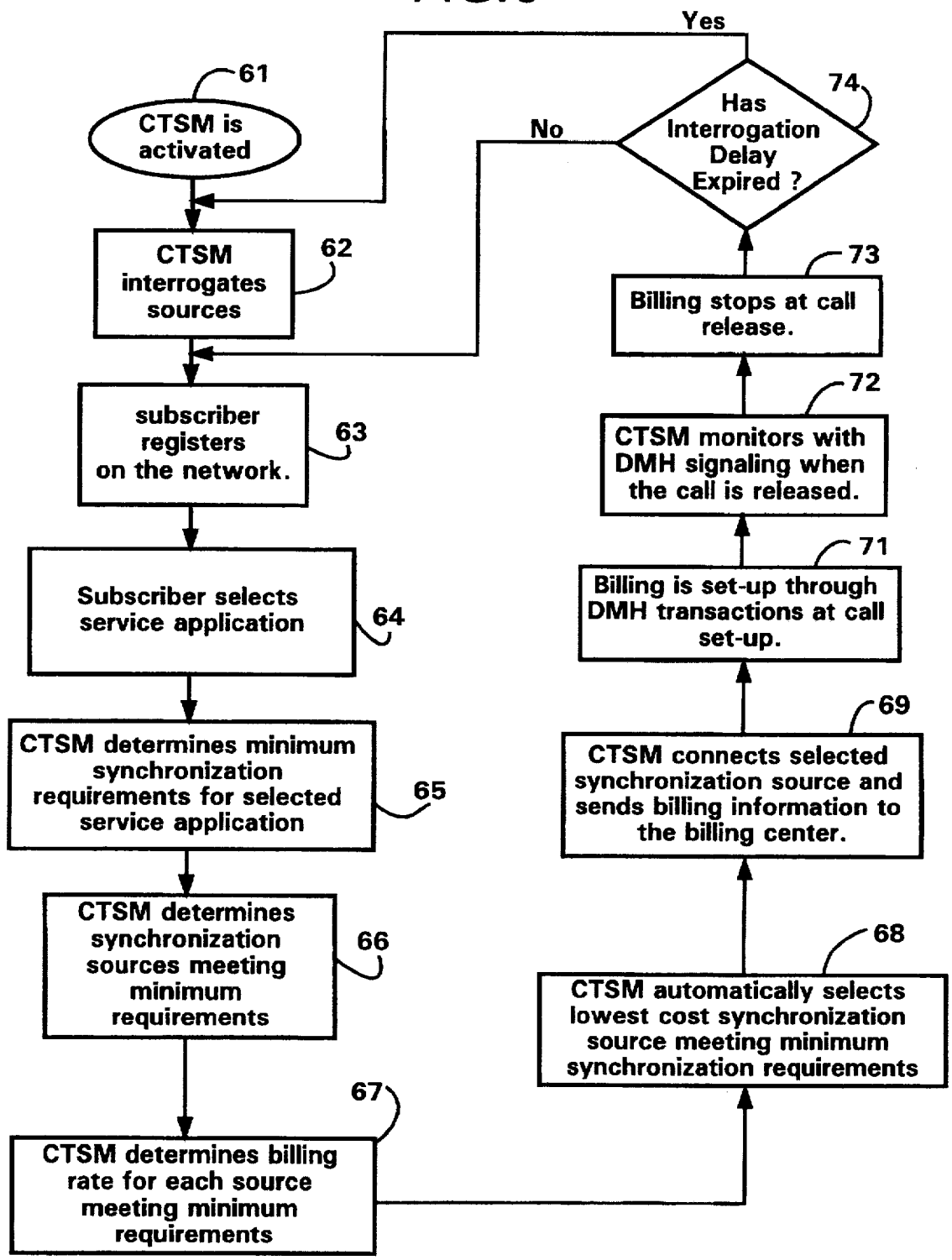
FIG. 5 is a flow chart illustrating the functions performed by the PCS Synchronization Model in a third embodiment of the present invention.

FIG. 5 is a flow chart illustrating the functions performed by the PCS Synchronization Model in a third embodiment of the present invention. The sequence begins at step 61 when the CTSM 16 is activated. At 62, the CTSM interrogates the synchronization sources 11–15 to determine their Stratum levels and availability. This interrogation is repeated periodically at the expiration of an interrogation delay since the availability of synchronization sources may change. At step 63, a subscriber registers on the telecommunications network. The system then moves to step 64 where the subscriber selects a service application such as, for example, data transfer. At step 65, the CTSM 16 determines the minimum synchronization requirements for the selected service application. The CTSM then determines at step 66 which of the available synchronization sources meet the minimum synchronization requirements. At step 67, the CTSM determines an associated billing rate for each of the available synchronization sources meeting the minimum synchronization requirements.

At step 68, the CTSM automatically selects the lowest cost synchronization source (i.e. the synchronization source with the lowest billing rate) that meets the minimum synchronization requirements. The CTSM then connects the selected synchronization source at step 69, and sends billing information to a billing center. The billing center sets up billing at step 71 through DMH transactions at call setup.

At step 72, the CTSM 16 determines when the call is released. This may be accomplished by monitoring DMH signaling. Billing stops at step 73 when it is determined that the call has been released. At step 74 it is determined whether or not the interrogation delay has expired. If it has not expired, then the system moves to step 63 and waits for the next subscriber to register on the network. If the delay has expired, then the system moves to step 62 where the synchronization sources are again interrogated for Stratum level and availability.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A network management system in a telecommunications network for selectively accessing a plurality of synchronization sources of varying levels of accuracy, availability, and cost, and for enabling an individual subscriber to select one of said plurality of synchronization sources for each telecommunication service application utilized by said subscriber, said system comprising:

means for informing said subscriber which of said plurality of synchronization sources are available for each of said service applications;

means for enabling said subscriber to select one of said plurality of synchronization sources for use with a service application;

a centralized transport synchronization module (CTSM) that interrogates said plurality of synchronization sources and selectively connects said sources to said telecommunications network; and means for informing said CTSM which of said plurality of synchronization sources is selected by said subscriber.

2. The network management system of claim 1 wherein said network management system further comprises:

means for determining a different billing rate applicable to each of said plurality of synchronization sources; and means for applying said determined billing rate to a call.

3. The network management system of claim 1 wherein said means for informing said subscriber which of said plurality of synchronization sources are available for each of said service applications includes means for sending a short message service (SMS) message from said CTSM to a mobile station utilized by said subscriber, said SMS message identifying which of said plurality of synchronization sources are available for each of said service applications.

4. The network management system of claim 3 wherein said means for enabling said subscriber to select one of said plurality of synchronization sources for use with a service application includes:

a mobile station; and means for sending an acknowledgement message from said mobile station to said CTSM when said SMS message identifies a synchronization source which is the subscriber's selected source.

5. The network management system of claim 1 wherein said CTSM includes:

means for interrogating each of said plurality of synchronization sources for information about each source's accuracy and availability;

means for mapping the subscriber's service applications with available synchronization sources; and means for selectively connecting said synchronization sources to said telecommunications network.

6. The network management system of claim 5 wherein said CTSM also includes means for validating the service applications of said subscriber by reading said service applications from a home location register (HLR) associated with said subscriber.

7. The network management system of claim 6 wherein said means for mapping the subscriber's service applications with available synchronization sources also includes means for mapping the subscriber's service applications with billing rates associated with said synchronization sources.

8. The network management system of claim 7 wherein said means for informing said subscriber which of said plurality of synchronization sources are available for each of said service applications includes means for informing said subscriber of the billing rates associated with said available synchronization sources.

9. In a telecommunications network, a method of selectively accessing a plurality of synchronization sources of varying levels of accuracy, availability, and cost, and for enabling an individual subscriber to select one of said plurality of synchronization sources for each telecommunication service application utilized by said subscriber, said method comprising the steps of:

interrogating said plurality of synchronization sources with a centralized transport synchronization module (CTSM) to determine each source's accuracy and availability;

informing said subscriber which of said plurality of synchronization sources are available for each of said service applications;

enabling said subscriber to select one of said plurality of synchronization sources for use with a service application;

informing said CTSM which of said plurality of synchronization sources is selected by said subscriber; and connecting said selected source to said telecommunications network.

10. The method of claim 9 further comprising the steps of:

determining a different billing rate applicable to each of said plurality of synchronization sources;

informing said subscriber of the billing rates for each of said synchronization sources; and applying the billing rate applicable to the synchronization source selected by said subscriber to a call.

11. The method of claim 9 wherein said step of informing said subscriber which of said plurality of synchronization sources are available for each of said service applications includes sending a short message service (SMS) message from said CTSM to a mobile station utilized by said subscriber, said SMS message identifying which of said plurality of synchronization sources are available for each of said service applications.

12. The method of claim 11 wherein said subscriber interfaces with said telecommunications network with a mobile station, and said step of enabling said subscriber to select one of said plurality of synchronization sources for use with a service application includes sending an acknowledgement message from said mobile station to said CTSM when said SMS message identifies a synchronization source which is the subscriber's selected source.

13. The method of claim 9 further comprising, after interrogating said plurality of synchronization sources to determine each source's accuracy and availability, the step of validating the service applications of said subscriber by reading said service applications from a home location register (HLR) associated with said subscriber.

14. The method of claim 13 further comprising, after validating the service applications of said subscriber, the step of mapping the subscriber's service applications with available synchronization sources.

15. The method of claim 14 wherein said step of mapping the subscriber's service applications with available synchronization sources also includes mapping the subscriber's service applications with billing rates associated with said synchronization sources.

16. The method of claim 15 wherein said step of informing said subscriber which of said plurality of synchronization sources are available for each of said service applications includes informing said subscriber of the billing rates associated with said available synchronization sources.

17. A network management system for supervising proper frame and time slot synchronization between radio base stations and mobile stations in a mobile telecommunications network, said system comprising:

means for interrogating a plurality of synchronization sources to determine each source's level of accuracy, availability, and cost;

means for enabling an individual subscriber to select a service application from a plurality of service applications;

means for determining minimum synchronization requirements for the selected service application;

means for determining which of said plurality of synchronization sources meet the minimum synchronization requirements for the selected service application;

means for informing said subscriber which of said plurality of synchronization sources are available and meet the minimum synchronization requirements for the selected service application;

means for enabling said subscriber to select one of said available synchronization sources that meet the minimum synchronization requirements for the selected service application; and means for connecting said selected synchronization source to said telecommunications network.

18. The system of claim 17 further comprising means for determining a billing rate associated with each of said plurality of synchronization sources.

19. The system of claim 18 further comprising means for informing said subscriber of the billing rate associated with each of said available synchronization sources that meet the minimum synchronization requirements for the selected service application.

20. A method of supervising proper frame and time slot synchronization between radio base stations and mobile stations in a mobile telecommunications network, said method comprising the steps of:

interrogating a plurality of synchronization sources to determine each source's level of accuracy, availability, and cost;

enabling an individual subscriber to select a service application from a plurality of service applications;

determining minimum synchronization requirements for the selected service application;

determining which of said plurality of synchronization sources meet the minimum synchronization requirements for the selected service application;

informing said subscriber which of said plurality of synchronization sources are available and meet the minimum synchronization requirements for the selected service application;

enabling said subscriber to select one of said available synchronization sources that meet the minimum synchronization requirements for the selected service application; and connecting said selected synchronization source to said telecommunications network.

21. The method of claim 20 further comprising, after determining which of said plurality of synchronization sources meet the minimum synchronization requirements for the selected service application, the step of determining a billing rate associated with each synchronization source that meets the minimum synchronization requirements for the selected service application.

22. The method of claim 21 further comprising, after informing said subscriber which of said plurality of synchronization sources are available and meet the minimum synchronization requirements for the selected service application, informing said subscriber of the billing rate associated with each of said available synchronization sources that meet the minimum synchronization requirements for the selected service application.

23. A network management system for supervising proper frame and time slot synchronization between radio base stations and mobile stations in a mobile telecommunications network, said system comprising:

means for interrogating a plurality of synchronization sources to determine each source's level of accuracy, availability, and cost;

means for enabling an individual subscriber to select a service application from a plurality of service applications;

means for determining minimum synchronization requirements for the selected service application;

means for determining which of said plurality of synchronization sources meet the minimum synchronization requirements for the selected service application;

means for determining a billing rate associated with each synchronization source meeting the minimum synchronization requirements for the selected service application;

means for automatically selecting a synchronization source having the lowest billing rate of said available synchronization sources that meet the minimum synchronization requirements for the selected service application; and means for connecting said selected synchronization source to said telecommunications network.

24. A method of supervising proper frame and time slot synchronization between radio base stations and mobile stations in a mobile telecommunications network, said method comprising the steps of:

interrogating a plurality of synchronization sources to determine each source's level of accuracy, availability, and cost;

enabling an individual subscriber to select a service application from a plurality of service applications;

determining minimum synchronization requirements for the selected service application;

determining which of said plurality of synchronization sources meet the minimum synchronization requirements for the selected service application;

determining a billing rate associated with each synchronization source meeting the minimum synchronization requirements for the selected service application;

automatically selecting a synchronization source having the lowest billing rate of said available synchronization sources that meet the minimum synchronization requirements for the selected service application; and connecting said selected synchronization source to said telecommunications network.

* * * * *